United States Patent [19]

Duncan et al.

[11] 4,263,695

[45] Apr. 28, 1981

[54] LUBRICATED PLAIN BEARING FOR RADIAL LOADS MADE OF INELASTIC PLASTIC MATERIAL

[76] Inventors: William D. Duncan; Carolyn L. Duncan, both of Rte. 4, Box 46A, Kokomo, Ind. 46901

[21] Appl. No.: 16,840

[22] Filed: Mar. 2, 1979

Related U.S. Application Data

[63] Continuation-in-part of Ser. No. 828,989, Aug. 30, 1977, abandoned.

[51] Int. Cl.³ .............................................. A22C 21/00
[52] U.S. Cl. ...................................... 17/11; 308/122; 308/238; 308/DIG. 8
[58] Field of Search ..................... 308/1 A, DIG. 8, 9, 308/76, 238, 121, DIG. 9, 122; 17/11

[56] References Cited

U.S. PATENT DOCUMENTS

| | | | |
|---|---|---|---|
| 3,812,627 | 5/1974 | Gebel et al. | 308/1 A |
| 3,837,717 | 9/1974 | Kipple et al. | 308/9 |
| 3,929,393 | 12/1975 | Marantette et al. | 308/122 |
| 3,950,820 | 4/1976 | Duncan et al. | 17/11 |
| 3,971,606 | 7/1976 | Nakano et al. | 308/36 R |
| 4,015,949 | 4/1977 | Baker et al. | 428/653 |

*Primary Examiner*—Lenard A. Footland
*Attorney, Agent, or Firm*—Fisher, Christen & Sabol

[57] ABSTRACT

A non lubricant-impregnated bearing for a metal shaft subjected to radial loads in an environment subjected to temperature changes and externally exposed to non-oleaginous liquids comprises a hard, extremely dense synthetic resin which is lubricated by a continuous film of the non-oleaginous liquid to which the bearing is externally exposed.

5 Claims, 3 Drawing Figures

FIG I

LUBRICATED PLAIN BEARING FOR RADIAL LOADS MADE OF INELASTIC PLASTIC MATERIAL

CROSS-REFERENCES TO RELATED APPLICATIONS

This is a continuation-in-part of our prior application Ser. No. 828,989, filed Aug. 30, 1977, abandoned, which is an improvement in an automatic poultry cutting machine of the type disclosed in U.S. Pat. No. 3,950,820 granted Apr. 20, 1976.

BACKGROUND OF THE INVENTION

In the above-identified patent a machine is disclosed in which whole eviscerated poultry carcasses are introduced to a conveyor mechanism which carries each carcass into successive engagement with a series of rotary cutters which sever the carcass into the desired number of portions including, if desired, splitting the carcass in half and removing the breast meat.

Machines of this type have been operated with great success insofar as making it possible for a single unskilled operator, working with a single automatic machine, to sever poultry into a number of portions, such as that known as the "Kentucky Fried Chicken" nine-piece cut which previously required the services of a skilled butcher or, in the case of unskilled workers, entailed the use of a number of separate machines positioned along an assembly line at as many as five different stations, each of which required the services of a separate worker.

However, in the case of the machine disclosed in the above-identified patent, it has been found that as a result of the high-speed of rotation of the various cutters, operating at speeds of 3,000 RPM or more, the conventional non-friction bearings are subject to excessive failure after only a relatively short period of use.

This may be due to the fact that it is necessary to provide sealed bearings packed with a small supply of grease in order to maintain proper sanitary conditions. It is obviously impossible to use bearings which require lubricating oil continuously supplied under pressure since, even if the lubricant were non-toxic, it would necessarily come in contact with the food and spoil the taste.

The conditions under which such a machine must operate may also contribute to bearing failure. In order to preserve optimum temperature conditions, in an experimental installation the cutting machine was placed in a "cold room" used for the temporary storage of the poultry carcasses received from the wholesaler, and cutting operations, as necessary, were performed at the usual low temperatures maintained in the storage room.

A concomitant cause of bearing detereoration under those circumstances was the necessary for keeping the rotary cutters bathed in a water spray. The bearings supporting the cutters were therefore continually in contact with water thrown off from the cutters. It is therefore theorized that the frequent temperature changes due to intermittent operation of the machine in a moisture saturated atmosphere and idleness at low temperature caused excessive condensation within the conventional non-friction bearings leading to their premature breakdown.

Not only do the conventional sealed bearings have a relatively short life of only two or three months, even in intermittent use, they become increasingly noisy prior to eventual failure and producing an excruciating whining noise as they approach the end of their usefulness which noise is environmentally intolerable.

Since there may be as many as seven, or more, cutters in a single machine, and the failure of only a single bearing requires the shutdown of the entire machine for several hours, with disassembly and reassembly of a bearing whenever the shutdown occurs it will be realized that each of the bearings has represented a weak link in an otherwise reliable chain.

DESCRIPTION OF THE PRIOR ART

It is known to use a bearing composed of an elastomer, such as rubber, for the "stuffing box" surrounding the steel propeller shaft of a water borne vessel. Such a bearing is positioned where the shaft passes through the hull and is lubricated by a constant supply of water. However, such shafts turn at relatively low speeds and there is no radial force exerted on the bearing during normal operation. An extremely complex form of bearing of this is disclosed in U.S. Pat. No. 3,971,606 to Nakano et al. In U.S. Pat. No. 3,929,393 to Marantette et al., there is shown a pair of conically shaper water lubricated rubber bearings supporting the ends of a drill spindle. Again, the forces on the bearings are axial, not radial, and a spring system is necessary to maintain the bearings in proper contract with the spindle. Another example of a bearing using a non-oleaginous fluid as a lubricant is the teflon air lubricated bearing shown in U.S. Pat. No. 3,837,717 to Kipple et al. Air lubricated bearings are well known for small devices rotating at extremely high speeds but under comparatively minuscule loads. Most of these bearings are designed to support only loads in axial thrust, as in the Kipple et al patent, and a bearing designed to use air as a lubricant cannot be used with a liquid lubricant.

Thus, to the applicant's knowledge all of the prior non-oleaginous liquid lubricated bearings use a form of elastomeric material for the bearing material and are thus not suitable for use when heavy radial loads are applied at high speed.

The applicants are also aware of the fact that in U.S. Pat. No. 4,015,949 to Baker et al it is proposed to use poly-phenylene sulfide (PPS) as a bearing material for use in such applications as internal combustion engines, using oil or grease as the lubricant. Said patent suggest that PPS may be used in a so called dry bearing by including polytetrafluorethylene (Teflon) with the PPS, but the applicants' are unaware of any actual use of PPS as a bearing material lubricated other than with conventional oleaginous metal bearing lubricants.

SUMMARY OF THE INVENTION

As a solution to these problems it has been discovered that the use of a plain bearing made of a food grade synthetic non-metallic material, lubricated with a potable non-toxic liquid, such as water, has produced surprisingly favorable results, which are far superior to the conventional sealed non-friction bearings. Apparently, not only are these bearings quieter in operation, they appear to be nearly indestructible. This latter statement is based on the observation that while the non-metallic bearing of the present invention will "freeze-up" if the water is not continuously supplied, as soon as the supply of water is resumed, the bearing becomes operative again with no apparent loss in effectiveness.

A particular advantage of the present invention is that, when the bearings are employed in a machine used for processing food, it enables the use of inexpensive and food-compatible liquid, such as water, for lubricating the bearings.

Another advantage of the invention is that, since it is essential that each of the cutters in the machine described in the above patent is bathed in a spray of water during operation it is possible to utilize the same water supply system for lubrication of the bearings of the present invention as used for treating the cutters themselves.

The continual exposure of the bearings to the water spray and the fact that the bearings are subjected to periods of rest at low temperatures used for food storage with resultant condensation of water is believed to have contributed to the premature failure of the usual metal non-friction bearings.

One particular composition, though not to be taken as limiting is a thermoplastic resin polyphenylene sulfide (PPS) such as is manufactured and sold by Phillips Chemical Company, a division of Phillips Pertoleum Company of Barttesville, Okla. 74004, under the trademark Ryton.

It is a further objection of this invention to provide a system for monitoring the supply of lubricant to the bearings so that any failure of that supply will automatically stop the machine, including the conveyor mechanism and other auxiliary devices which, if not stopped, would otherwise cause jamming of the machine.

DESCRIPTION OF A PREFERRED EMBODIMENT

Figure 1:
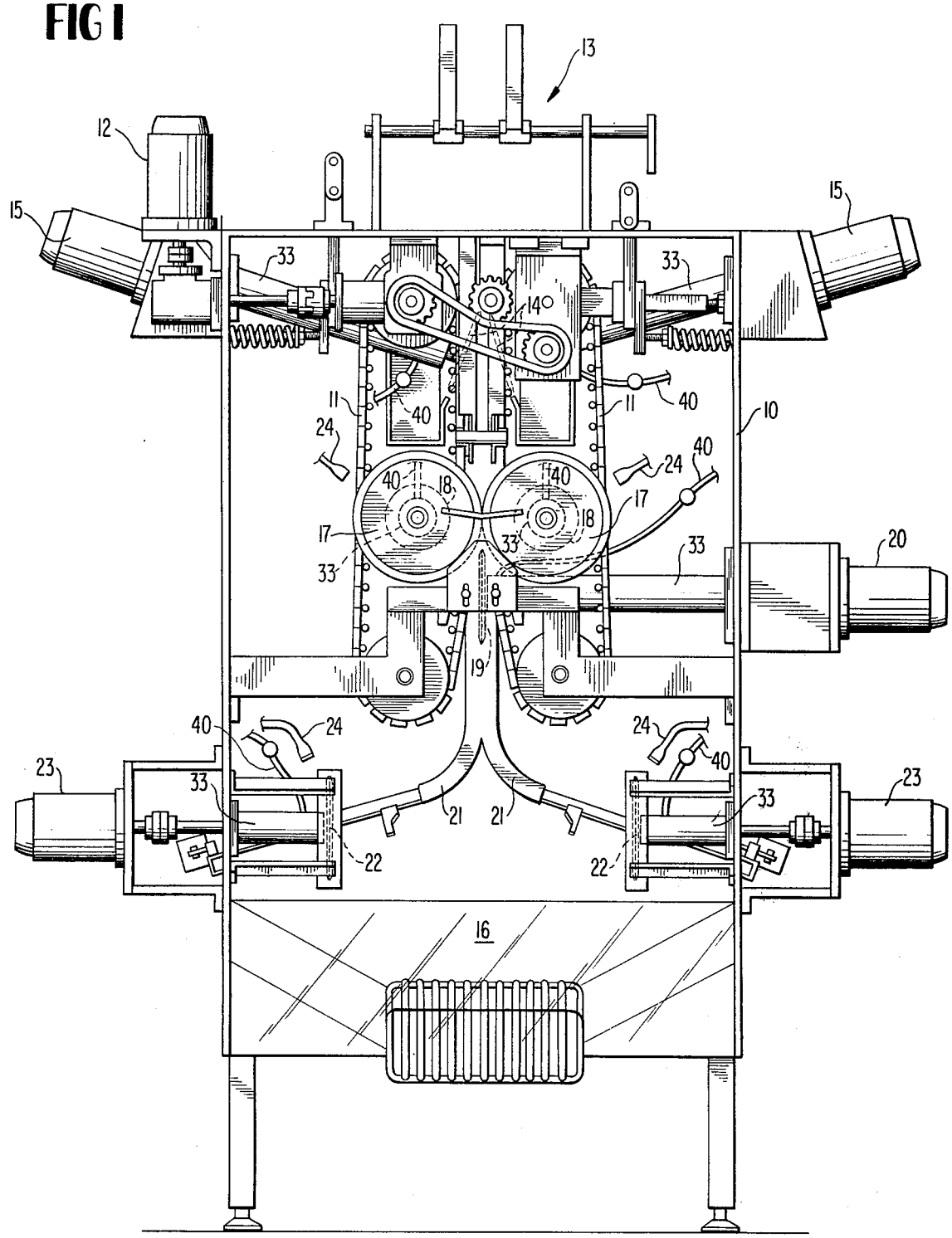
FIG. 1 is a rear elevation of an automatic poultry cutting machine of the type disclosed in U.S. Pat. No. 3,950,820, equipped with a preferred form of bearings in accordance with the present invention.

As described in said U.S. Pat. No. 3,950,820 the machine of FIG. 1 comprises an enclosure 10 which supports a number of mechanisms for automatically cutting eviscerated poultry into a predetermined number of portions. The machine includes a conveyor means comprising a pair of cooperating endless conveyors 11 which are driven by a motor 12 for gripping the opposite sides of a poultry carcass which is introduced to the upper ends of the conveyors manually, or by means of a feeding mechanism indicated generally by numeral 13 and described in detail in said prior patent.

The endless conveyors carry a carcass downwardly into engagement successively with a pair of rotary cutters, or knives, 14, driven by electric motors 15 for severing the wings from the carcass, after which they drop downwardly into a collecting hopper 16, or onto a conveyor (not shown). The carcass then reaches a pair of cutters 17, driven by motors 18 (or by a single motor in tandem).

The rotary cutters 17 perform the dual function of severing the legs from the thighs of the poultry as well as the breast meat from the carcass, the severed portions also falling into the hopper. Immediately thereafter, the remainder of the carcass is split into two halves in the plane of the backbone by cutter 19, driven by motor 20. The respective halves, with the attached thighs, then fall separately into a pair of outwardly diverging chutes 21. Finally, each of the carcass halves is positioned on the generally horizontal surfaces of the chutes and moved into engagement with the respective cutters 22, driven by motor 23, where the thighs are severed from the remaining half portions of the carcass, with the severed portions ending up in hopper 16.

Each of the cutters referred to above is secured to the end of a shaft which is rotatably driven at high speed by a respective motor, and each of the cutters is preferably bathed in a liquid medium, such as water, supplied under pressure by a series of nozzles 24 placed adjacent each of the rotary cutter blades. All of the foregoing has been described and claimed in said prior U.S. Pat. No. 3,950,820.

Figure 2:
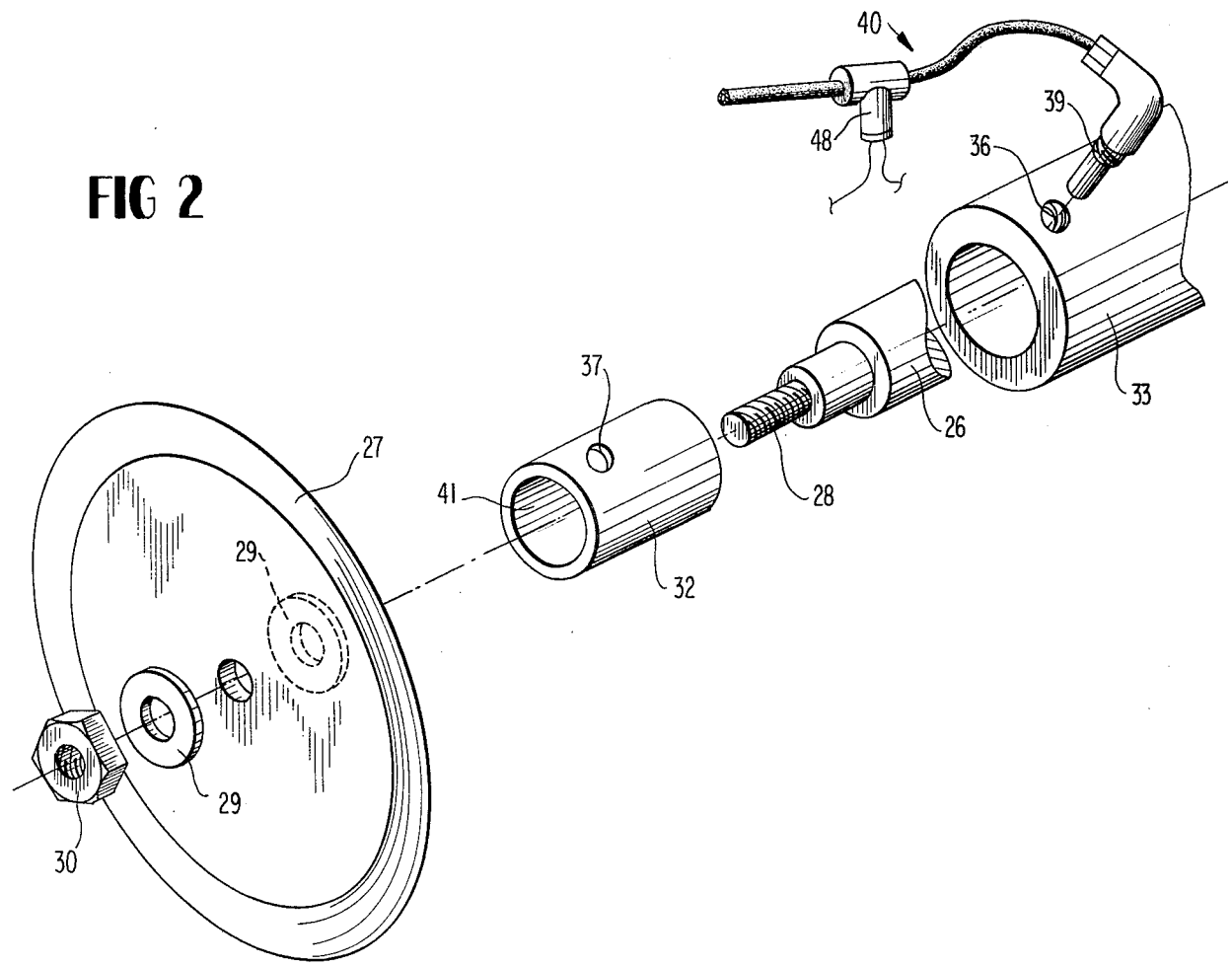
FIG. 2 is an exploded view of a typical bearing used for each of the rotary cutters in the machine of FIG. 1.

Each of the cutters is supported at the end of a shaft, preferably made of stainless steel mounted in a bearing, indicated generally by numeral 25 in FIG. 2, supported in the housing 33 shown in FIG. 1. As shown in FIG. 2, the typical bearing assembly includes a metal shaft 26 which is driven by a motor through a suitable coupling (not shown). The end of the shaft has a reduced portion which extends through the mounting hole of a rotary knife blade 27 and terminates in a threaded portion 28 to receive a pair of washers 29 and a securing nut 30. The shaft which, because of its use in the preparation of food, is preferably of stainless steel, is immediately surrounded by a cylindrical liner 32 molded, or otherwise formed from a non-metallic material such as a high-strength, high-density polyethylene sufide, a composition sold commercially under the trade name Ryton by the Phillips Chemical Company a division of Phillips Petroleum Company of Barttesville, Okl. 74004. The liner is received within the open end of the housing 33 which is firmly attached to a suitable portion of the framework of the machine to maintain the cutter in its proper position. The housing 33 and liner 32 are each provided with an aligned radial opening identified by numerals 36, and 37 into which openings the end 30 of a hollow tube, indicated generally by numeral 40, is inserted. This tube performs the dual function of supplying fluid lubricant, such as water, under pressure to the space between shaft 26 and the inner surface 41 of liner 32 as well as preventing rotational and axial displacement of the liner.

As a typical example, though not to be taken as limitative, a rotary cutter 27 may have a diameter of 9 inches mounted on a stainless steel shaft 26 having a diameter of 1 inch coupled to a 1 hp motor which drives the cutter at speeds in the neighborhood of 3400 RPM. In that case, the outside diameter of the liner 32 may be $1\frac{7}{8}$ inches.

Figure 3:
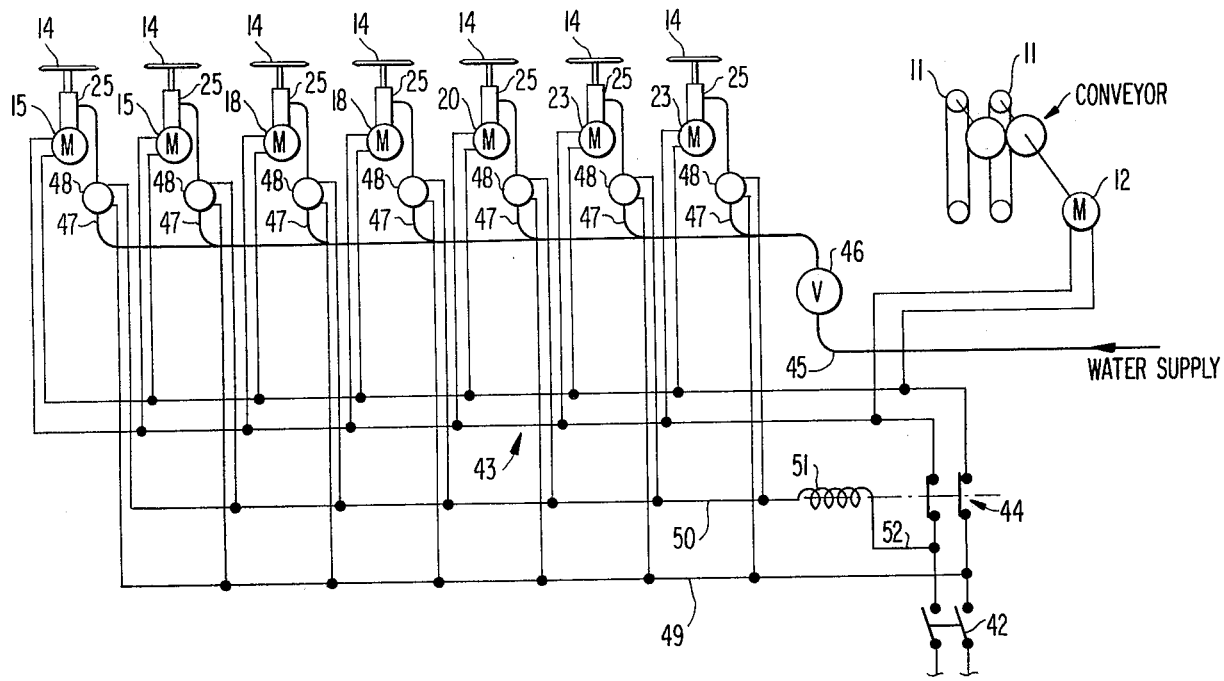
FIG. 3 is a schematic diagram of a system for monitoring the supply of lubricant to the bearings.

FIG. 3 is a schematic diagram of the lubricant supply and electrical circuit concerned with driving the cutters and conveyor of a machine of the type shown in FIG. 1, in which power from an electrical source is fed by a main switch 42 to a distribution line 43 to supply the motor 12 for the conveyors 11 and motors 15, 18, 20 and 23 for the respective cutters 14, 17, 19 and 22. (To avoid complexity, a single phase circuit is shown although in actual service it is more likely that the motors will be of the three phase type for which suitable modifications in the circuitry and switchgear would be made). The supply circuit also includes, between the main switch 42 and the input end of the distribution line, an electrically operated, normally closed, relay switch 44 for a purpose to be explained.

Water under pressure from a source, not shown, but which may be ordinary cold tap water, is supplied to the inlet end 45 of a conduit system for the bearing lubricant. The system may have a main control valve 46 and a series of branch lines 47 to supply the water to each of the tubes 40 connected to the shaft bearings for the cutters. Each of the tubes 40 is also provided with a pressure-sensitive switch 48 preferably located near each bearing for the purpose of detecting any lack of pressure in the supply of liquid through that bearing. These pressure-sensitive switches are connected in parallel with each other by leads 49 and 51 and lead 49 connects with one side of the power supply, while lead 50 is connected in series with coil 51 of relay switch 44 and the other side of the power supply by lead 52. In this way, assuming that each of the pressure switches 48 is of the type that is normally closed in the absence of pressure (or when pressure falls below an acceptable) it will be apparent that in the event that the valve 46 is closed, or a stoppage in any of the branch lines 47 prevents the supply of water to any one of the bearings, the appropriate pressure switch, or switches, 48 will close and energize coil 51 to open switch 44. This will cut off power to all of the cutters as well as the conveyor motor 12 to prevent damage to the affected bearing, or bearings, and also to prevent jamming of the machine which would result from continuous movement of conveyor 11. As will be apparent, leads 49 and 52 are connected to the main electrical supply ahead of switch 44 to prevent de-energizing coil 51 when the relay switch is open.

In operation, the valve 46, supplying the lubricating water, should be opened to pressurize each of the bearings 25 prior to closing the main switch 42. Otherwise, the lack of lubricant to any one of the bearings would cause the associated pressure switch 48 to close the circuit to coil 51 thus opening switch 44 and preventing operation of any of the motors in the system.

Obviously, other types of safety devices may be employed. Furthermore, it should also be apparent that if the motors for operating the various devices, such as the cutters and conveyor, are hydraulic motors or operated by hydraulic fluid supplied under pressure, the circuit of FIG. 3 could be modified to substitute electrically operated valves to control the source of operating fluid to the motors.

In addition, since each of the rotary blades is normally bathed in water by nozzles 24 to enhance the quality of results achieved by machines of this type, these nozzles as well as the bearings may be supplied from the same distribution system, such as the tubes 40, in which case any failure of the supply water to the nozzles would also be monitored by the same system.

While it is believed that various compositions primarily comprised of PPS with inert non-lubricating fillers, such as glass or numerals would be satisfactory the material used in the present invention is that sold under the Ryton trademark with the grade designation R-4. This comprises a mixture of polyphenylene sulfide and 40% glass, and can be molded by extrusion and formed in block form and machined to the final shape. In the present case, the bearings were made from bar stock, the bores for the shafts being drilled axially therethrough.

It is believed that PPS is peculiarly suitable for use as a bearing material for metal shafts under conditions where oleaginous lubricants are unsuitable. In addition to its usefulness in food processing, where lubricants must not contaminate the food it is suitable for environments where the bearings are subjected to liquids that are imcompatible with normal lubricants as, for example, rotating brushes used in car washing installations, or in pumps for petroleum products such as gasoline or diesel fuel. In these cases, the liquid to which the bearings are subjected is used as the lubricant.

In the claims the material PPS refers to polyphenylene sulfide, which may be formed as a cylindrical bearing surface by injection molding or may be machined from a solid block, such as bar stock. It may include such strengthening fillers of a non-lubricating nature, such as glass, or a combination of glass and mineral filling.

According to information furnished by Phillips Chemical Company, the preferred material Ryton R-4 contains 40% glass, has a density of 1.6 g/cc. and a water absorption of less than 0.05%. It has a tensile strength of 19,500 psi, elongation of 1.3% with a flexural strength of 29 psi, flexural modulus of 1.700 psi, a compressive strength of 21,000 psi and a Rockwell hardness of R 123. It has a coefficient of thermal expansion, in/in/°F $\times 10^{-5}$ of 1.1 and thermal conductivity, btu.in/h.ft$^2$.°F of 2.0. While the material may be affected by som oxidizing acids, some amines and halogens, it is resitant to all solvents below 400° F.

We claim:

1. In a bearing for a food processing machine of the type wherein a rotary cutter mounted on a metal shaft is supported on metal bearing support for rotation at high speed, the cutter being subjected to a substantially continuous spray of water and the bearing being exposed to the water and food products thrown off by operation of the cutter, the combination comprising:
   said metal bearing support being provided with an inner surface substantially larger in cross-section than said shaft;
   an elongated bearing liner comprising a continuous shell of polyphenylene sulfide, the outer surface thereof conforming to the inner surface of said bearing support, the inner surface of the shell being cylindrical and closely conforming to the outer surface of said shaft;
   said shell being provided with a lateral passage for communication with a passage in said bearing support;
   means to continuously supply water under pressure to said passages for supplying a lubricating film of water between the surface of the shaft and the inner surface of the shell and means to prevent relative rotation of the shell with respect to the bearing support.

2. A bearing as defined in claim 1, wherein the inner and outer surfaces of said shell are cylindrical and said means to prevent relative rotation of the shell comprises a tubular conduit member extending laterally of the shaft between said passages in the shell and bearing support.

3. The invention defined in claim 1, wherein said food processing machine also includes conveyor means for moving food products to said cutter, said cutter and conveyor means being driven by electric motors from a common power supply, and means for sensing the water pressure at the cutter bearing and to disconnect the common power supply in the absence of water pressure at said cutter bearing.

4. A bearing as defined in any one of claims 1, 2, or 3 wherein the shaft for a cutter rotates at a speed of at least 3000 rpm.

5. A bearing as defined in any one of claims 1, 2, or 3 wherein said liner comprises polyphenylene sulfide and 40% glass.

* * * * *